Nov. 30, 1926.
C. D. TUSKA
1,609,006
VARIABLE CONDENSER
Filed June 17, 1922
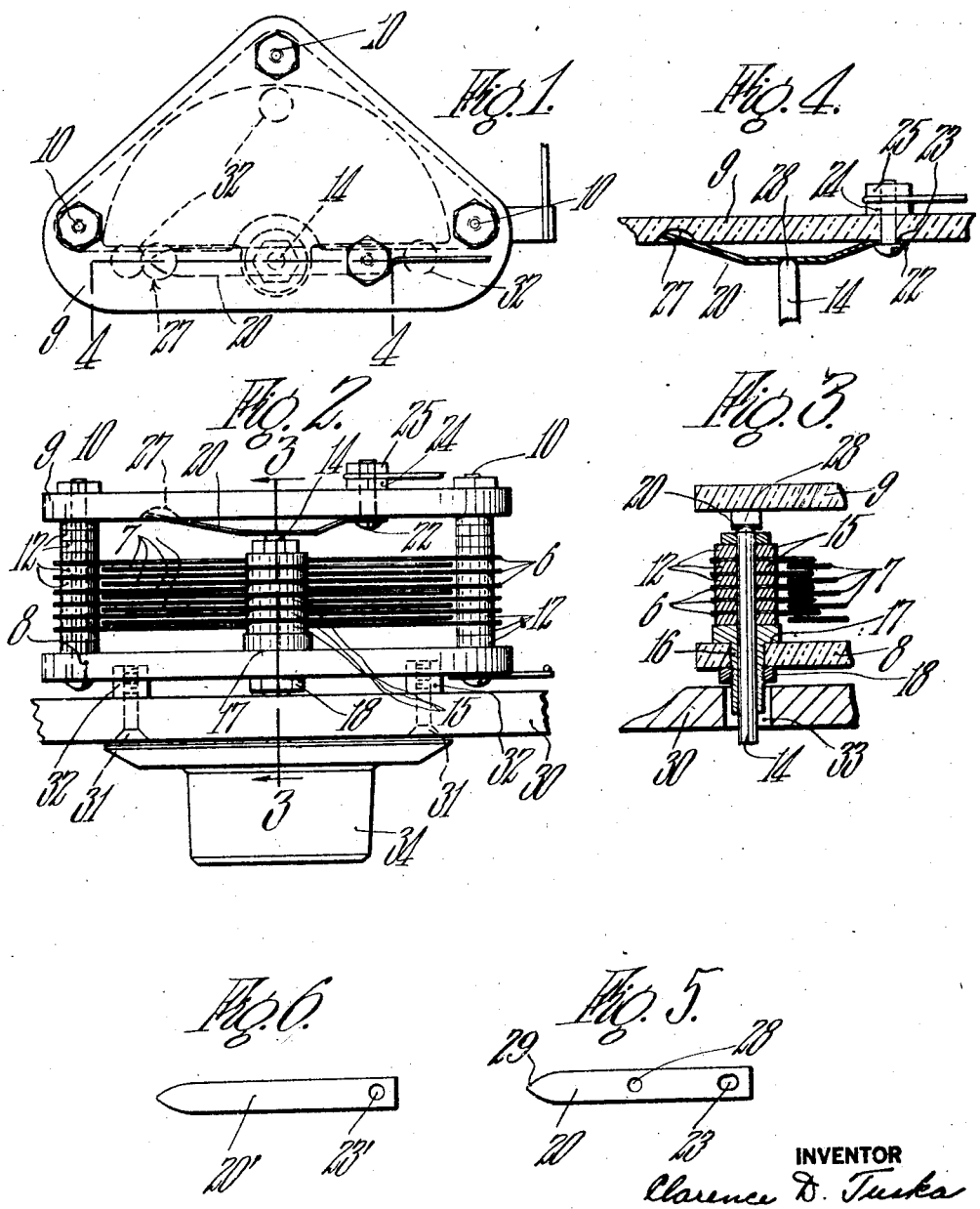

Patented Nov. 30, 1926.

1,609,006

UNITED STATES PATENT OFFICE.

CLARENCE D. TUSKA, OF HARTFORD, CONNECTICUT, ASSIGNOR TO THE C. D. TUSKA COMPANY, OF HARTFORD, CONNECTICUT, A CORPORATION OF CONNECTICUT.

VARIABLE CONDENSER.

Application filed June 17, 1922. Serial No. 569,083.

This invention relates to variable condensers such as are used to vary the capacitance of radio circuits.

More particularly the invention relates to condensers of the type commonly known as rotary variable air condensers wherein a set of fixed metal plates and a set of movable metal plates are arranged in spaced-apart interleaved relation to provide alternate conductors of opposite polarity separated by layers of air dielectric, the movable plates being rotatably adjustable as a unit to vary the capacity of the condenser.

In a variable condenser of this general type, as heretofore commonly constructed, the fixed conductor plates are arranged between dielectric end pieces or frame members, said plates and end pieces being secured together by means of suitable tie-bolts and maintained in the requisite spaced-apart relation by spacing collars upon the tie-bolts. The movable conductor plates are rigidly secured to a rotatable shaft which is journaled in bearings in the end plates and is usually frictioned so that it will be effectively maintained in adjusted position. With the fixed elements of the condenser constructed as above described it has been found difficult and expensive and generally impracticable in a reasonably priced device to assemble the various parts so that the shaft bearings in the end pieces or frame members will be accurately alined. When the bearings for the shaft are not properly alined, the shaft of the rotatable unit will be improperly journaled and will fail to turn smoothly and further the movable plates may be not be supported in the desired parallel relation to the fixed plates. A jerky turning of the rotatable unit due to improperly alined bearings causes great difficulty in obtaining the fine adjustments which are so desirable in a variable condenser of this type.

The present invention is concerned with improvements which are calculated to obviate the difficulties above mentioned as well as to effect economy in the cost of manufacturing variable condensers.

To this end provision is made in accordance with the present invention, for insuring a suitable and mechanically accurate mounting of the shaft of the rotatable condenser element without interfering with the convenient and rapid assembly of the various parts.

The invention further contemplates the provision of means for performing the combined functions of supplying a bearing from one end of the rotatable condenser shaft; for appling yielding pressure to said shaft to frictionally oppose its rotation sufficiently to hold it effectively in various positions of adjustment; and for establishing circuit connection with said shaft.

The invention comprises the features of construction hereinafter described and particularly pointed out in the appended claims.

Referring to the accompanying drawings,—

Fig. 1 is a plan view of the improved condenser;

Fig. 2 is a front elevational view thereof;

Fig. 3 is a sectional view taken on the line 3—3 of Fig. 2;

Fig. 4 is a sectional view taken on the line 4—4 of Fig. 1;

Fig. 5 is a plan view of one of the parts shown in Fig. 2; and

Fig. 6 is a plan view showing an alternative form of said part.

Referring to the drawings, the fixed conductor plates of the illustrated condenser are indicated at 6 and the interleaved movable plates at 7. The fixed plates 6 are of the usual semi-circular shape and are disposed in parallel planes between end pieces 8 and 9 of suitable insulating material. The end pieces 8 and 9 are secured together in the usual manner by means of tie-bolts 10 which also extend through the fixed plates 6 and the latter are spaced from one another and from the end pieces by means of collars 12 which encircle the tie-bolts.

The movable plates 7, which are also of the usual semi-circular shape, are rigidly secured to a rotatable shaft 14 which is journaled in a bearing in the end piece 8, and said plates are maintained in spaced-apart relation by washers 15 on said shaft. The shaft bearing in the end piece 8 consists of a sleeve 16 (Fig. 3) which is enlarged at one end to form an annular shoulder 17 for engagement with the inner face of the end piece 8. The opposite end of the bearing sleeve 16 projects outwardly beyond the end piece 8 and is exteriorly screw-threaded to receive a nut 18 which is tightened against the outer face of the end piece 8 to secure the bearing sleeve in position.

Except for the specific construction of the bearing sleeve 16, all the parts above referred to are or may be of the same construction and they may have the same relative arrangement as corresponding parts of variable condensers heretofore commonly employed.

In accordance with the present invention a resilient metallic strip 20 (Figs. 4 and 5) is provided to supply the bearing for the end of the shaft 14 which is adjacent the end piece 9. As shown, the strip 20 is secured to the under side of the end piece 9 by means of a bolt 22 which extends through a slightly elongated slot 23 in the end piece 9 and is held in place by the engagement of a nut 24 with the outer face of said end piece. A second nut 25 is threaded upon the bolt 22 adapting the latter to serve as a binding post as will later appear. The bearing strip 20 is bowed away from the end piece 9 as shown in Fig. 4, and the end remote from the bolt 22 is received in a depression 27, this end of the strip being pointed, as shown at 29 in Fig. 5, to enable it to engage the base of said depression.

The bowed form of the bearing strip 20 permits the same to yield toward the end piece 9. The depression 27 serves to locate the free extremity of the bearing strip without interfering with its yielding movement and also permits the strip to swing slightly about the bolt 22 without becoming disengaged from the depression. The bearing strip is so positioned that when the end piece is assembled in place the bearing strip will engage the unsupported end of the shaft 14 to provide an end bearing therefor to secure the same against axial displacement in the direction of the end piece 9. The bearing strip 20 is further designed to exert sufficient pressure against the shaft 14 to insure that said shaft will be frictionally maintained in any position of adjustment into which it may be turned. Preferably the bearing strip 20 is provided with an aperture 28 having a diameter less than that of the shaft 14 and said shaft has a rounded extremity adapted to project into the aperture 28. Thus a circular bearing engages the convex end of the shaft 14 providing in effect a journal bearing affording lateral support for said shaft as well as preventing endwise displacement thereof.

The bearing strip 20, being secured at one end only by means of the bolt 22 is adapted to swing slightly in a lateral edgewise direction, as the rounded free extremity of the shaft 14 enters the bearing aperture 28, if such movement is necessary to bring said aperture into axial alinement with the shaft. If the bearing aperture 28 does not readily accommodate itself to the shaft 14, either by the above described pivotal adjustment of the bearing strip or by virtue of its yielding movement toward the end piece 9 as the latter is brought into assembled position, the required adjustment of the bearing strip may be easily effected by manipulation of the strip, the bolt 22 being loosened if necessary to permit longitudinal shifting of the strip.

After the above mentioned parts of the condenser have been assembled the whole device may be rigidly secured to a panel, such as indicated at 30, or other support, by means of screws 31 which may extend through the support and are threaded into lugs 32 on the end piece 8. The lugs 32 may have metallic bushings inserted therein which are internally screw-threaded to receive the threads of the fastening screws 31.

The shaft 14 projects outwardly beyond the end piece 8 and is adapted to extend loosely through an opening 33 in the supporting panel and to have a suitable dial knob 34 rigidly secured to its outer extremity for use in adjusting the movable plates 7.

The bearing strip constructed and arranged as above described provides a bearing for the shaft 14 and also exerts sufficient pressure against the end of the shaft to frictionally hold the movable plates in adjusted positions. In addition to these functions, the bearing strip 20 is designed to serve as a conductor of current from the movable condenser plates. To electrically connect the bearing strip 20 with the circuit, a circuit wire may be clamped between the nuts 24 and 25 as shown in Fig. 2. It will be apparent that by reason of the tension of the spring-bearing strip and the circular line contact between the edge of the bearing aperture 28 and the rounded end of the shaft 14, an extremely effective electrical connection is insured at all times with the movable element of the condenser.

A modification of the bearing strip indicated at 20' is shown in Fig. 6 wherein the bearing aperture 28 is omitted. In this form of bearing strip it is obvious that no manipulation of the strip is necessary to accommodate it to the shaft of the condenser and consequently, a circular aperture 23 may be provided to receive the fastening bolt 22 instead of an elongated slot as shown in the preferreed form of the bearing strip.

It will be readily appreciated that the use of the herein described bearing strip obviates the difficulties of assembly attendant upon a construction of condenser wherein both bearings for the shaft of the rotatable element are formed in or non-adjustably carried by the end pieces or frame members of the device. The present construction insures that irrespective of slight variations in the assembled relation of the end pieces, the shaft bearings will be alined properly and the shaft will be properly journaled so that it will turn smoothly and without end play and with the movable condenser plates supported in proper spaced relation to the fixed plates, in all positions of radial adjustment of the former.

The invention has been disclosed herein for illustrative purposes in an embodiment at present preferred but the scope of the invention is defined in the appended claims rather than in the foregoing description.

What I claim is:—

1. In a variable condenser, the combination with the stationary and movable plates of a shaft to which the movable plates are secured, of a journal bearing for one end of said shaft and a yieldable bearing for the opposite end thereof adapted for alignment with the journal bearing and arranged to exert a frictional drag on said shaft, the said yieldable bearing formed intermediate its ends to have an offset portion for bearing against said shaft with said ends bearing against said support.

2. In a variable condenser, a support, a plurality of stationary condenser plates fixed to said support, a rotatable shaft having secured thereto a plurality of rotary condenser plates, a journal bearing carried by said support for supporting one end of said shaft, a yieldable bearing fixed to said support adjacent the other end of said shaft adapted to align itself with the said journal bearing and arranged to exert a frictional drag on said shaft, the said yieldable bearing formed intermediate its ends to have an offset portion for bearing against the end of said shaft with said ends bearing against said support.

3. In a variable condenser, a support, a plurality of stationary condenser plates fixed to said support, a rotatable shaft having secured thereto a plurality of rotary condenser plates, a journal bearing carried by said support at one side of said plates for supporting said shaft, a yieldable bearing fixed at one said ends to said support, having its other end slidable along said support and being provided with a portion intermediate its ends for engaging the end of said shaft and being adapted to exert a frictional drag upon said shaft and arranged to permit the shaft to be maintained in alignment with the first named bearing.

4. In a variable condenser, the combination with the stationary and movable condenser plates, of dielectric frame members between which said plates are mounted, a rotatable shaft to which said movable plates are secured said shaft having a rounded end, a bearing in one of said frame members in which said shaft is journaled, and a second bearing for said shaft comprising a resilient strip adjustably secured at one end to the other of said frame members and having an aperture therein of less diameter than said shaft for receiving the rounded end of the shaft, said strip adapted to engage said rounded end in axial alinement with said first bearing.

5. In a variable condenser, the combination with the stationary and movable condenser plates, of dielectric frame members between which said plates are mounted, a rotatable shaft to which said movable plates are secured, a bearing in one of said frame members in which said shaft is journaled, and an end bearing for said shaft comprising a resilient strip secured at one end to the other of said frame members, said strip having its opposite end bearing against said frame member and its central portion offset therefrom to bear yieldingly against the end of the shaft in axial alinement with said first bearing.

6. In a variable condenser, the combination with the stationary and movable condenser plates, of a rotatable shaft to which said movable plates are secured, a dielectric frame member at one side of said plates having a bearing in which said shaft is journaled, a second dielectric frame member at the opposite side of said plates having a locating recess therein, an end bearing for said shaft comprising a resilient strip adjustably secured at one end to the inner surface of second frame member and having its opposite end shaped to enter said locating recess, said strip having its central portion laterally offset from said frame member to yieldingly engage the end of the shaft in axial alinement with said first bearing and having an aperture therein of less diameter than the shaft, and a bearing face at the end of the shaft adapted to project into said aperture.

In testimony whereof I have affixed my signature.

CLARENCE D. TUSKA.